(12) United States Patent
Shin et al.

(10) Patent No.: US 9,374,354 B2
(45) Date of Patent: Jun. 21, 2016

(54) METHOD AND APPARATUS FOR SHARING CONTENT

(71) Applicant: SAMSUNG ELECTRONICS CO., LTD., Suwon (KR)

(72) Inventors: In-young Shin, Seoul (KR); Joon-oo Kim, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 68 days.

(21) Appl. No.: 13/974,661

(22) Filed: Aug. 23, 2013

(65) Prior Publication Data

US 2014/0059644 A1 Feb. 27, 2014

(30) Foreign Application Priority Data

Aug. 24, 2012 (KR) .................. 10-2012-0093255

(51) Int. Cl.
| | |
|---|---|
| H04L 29/06 | (2006.01) |
| G06F 21/10 | (2013.01) |
| G06F 21/30 | (2013.01) |
| G06F 21/44 | (2013.01) |

(52) U.S. Cl.
CPC ............... *H04L 63/08* (2013.01); *G06F 21/10* (2013.01); *G06F 21/305* (2013.01); *G06F 21/44* (2013.01); *H04L 63/10* (2013.01)

(58) Field of Classification Search
CPC ......... H04L 63/08; H04L 63/10; G06F 21/44; G06F 21/305; G06F 21/10
USPC ............................................................ 726/2
See application file for complete search history.

(56) References Cited

U.S. PATENT DOCUMENTS

| | | | | |
|---|---|---|---|---|
| 7,676,026 | B1 * | 3/2010 | Baxter, Jr. ............ | H04M 1/2473 379/88.01 |
| 8,365,258 | B2 * | 1/2013 | Dispensa ............. | H04L 63/0869 705/64 |
| 2001/0003523 | A1 | 6/2001 | Crandall et al. | |
| 2003/0018918 | A1 * | 1/2003 | Natsuno .............. | H04L 63/0861 726/4 |
| 2003/0134615 | A1 * | 7/2003 | Takeuchi ............... | G06Q 20/02 455/411 |
| 2005/0125238 | A1 * | 6/2005 | Jansen ............... | G06Q 10/0637 705/26.1 |

(Continued)

FOREIGN PATENT DOCUMENTS

| | | |
|---|---|---|
| EP | 1 439 674 A2 | 7/2004 |
| GB | 2495571 A * | 4/2013 ............ G06F 21/313 |

(Continued)

OTHER PUBLICATIONS

PCT International Search Report and Written Opinion of the International Searching Authority mailed Nov. 21, 2013 in corresponding International Application No. PCT/KR/2013/007409.

(Continued)

*Primary Examiner* — Michael S McNally
(74) *Attorney, Agent, or Firm* — Staas & Halsey LLP

(57) ABSTRACT

A method and apparatus for sharing content by selecting a device with which the content is to be shared and performing authentication by using a device which is being called. The method of sharing content of a first device includes: performing authentication of a remote access service for sharing the content with a second device based on a call connection state between the first device and the second device; remotely accessing the second device according to a result of the authentication; and sharing the content based on the remote access.

20 Claims, 12 Drawing Sheets

(56) References Cited

U.S. PATENT DOCUMENTS

| | | |
|---|---|---|
| 2005/0226196 A1 | 10/2005 | Suh |
| 2007/0016796 A1* | 1/2007 | Singhal ............... G06Q 20/32 713/183 |
| 2007/0168457 A1* | 7/2007 | Huerta ............... G06Q 30/02 709/217 |
| 2007/0243887 A1* | 10/2007 | Bandhole ............ H04M 3/493 455/461 |
| 2008/0091799 A1* | 4/2008 | Weaver ............ H04M 3/4938 709/218 |
| 2008/0181201 A1 | 7/2008 | Park et al. |
| 2009/0041227 A1* | 2/2009 | Altberg ............ H04M 3/4878 379/265.01 |
| 2009/0094531 A1 | 4/2009 | Danieli et al. |
| 2009/0234955 A1 | 9/2009 | Hanley et al. |
| 2009/0298469 A1* | 12/2009 | Kim ............... H04M 1/72522 455/411 |
| 2015/0063552 A1* | 3/2015 | Bender ............... H04L 9/3215 379/142.05 |
| 2015/0278504 A1* | 10/2015 | Azim ................. G06F 21/44 726/3 |

FOREIGN PATENT DOCUMENTS

| | | |
|---|---|---|
| JP | 2009-237662 | 10/2009 |
| KR | 10-2008-0065158 | 7/2008 |
| KR | 10-2010-0000656 | 1/2010 |
| KR | 10-2011-0081469 | 7/2011 |

OTHER PUBLICATIONS

European Search Report dated Mar. 4, 2016 issued in corresponding European Patent Application 13831078.4.

* cited by examiner

METHOD AND APPARATUS FOR SHARING CONTENT

CROSS-REFERENCE TO RELATED APPLICATIONS

This application claims the priority benefit of Korean Patent Application No. 10-2012-0093255, filed on Aug. 24, 2012, in the Korean Intellectual Property Office, the disclosure of which is incorporated herein in its entirety by reference.

BACKGROUND

1. Field

Example embodiments of the present disclosure relate to a method and apparatus for sharing content, and more particularly, to a method and apparatus for connecting devices and sharing content based on a call connection state between the devices.

2. Description of the Related Art

In order to share content that is stored in a device, a user generally searches for a device with which the content is to be shared, obtains network information, and performs an authentication process for sharing the content by being connected to the device with which the content is to be shared.

However, in this case, the user is inconvenienced because the user has to directly search for the device with which the content is to be shared.

SUMMARY

Additional aspects and/or advantages will be set forth in part in the description which follows and, in part, will be apparent from the description, or may be learned by practice of the disclosure.

The present disclosure provides a method and apparatus for sharing content by simply using a device which is being called without forcing a user to search for the content and to perform a separate authentication process for sharing the content.

According to an aspect of the present disclosure, there is provided a method of sharing content of a first device, the method including: performing authentication of a remote access service for sharing the content with a second device based on a call connection state between the first device and the second device; remotely accessing the second device according to a result of the authentication; and sharing the content based on the remote access.

The remotely accessing the second device may include: obtaining network information about the second device according to the result of the authentication; and remotely accessing the second device by using the network information.

The performing of the authentication may include performing the authentication in further consideration of whether a phone number of the second device is stored in the first device.

The performing of the authentication may include: transmitting authentication information that requests an authentication server to authenticate the remote access service to the authentication server; and receiving information about the result of the authentication based on the call connection state between the first device and the second device from the authentication server.

The transmitting of the authentication information to the authentication server may include: storing an encryption key for the authentication; and when a phone number of the second device is stored in the first device, transmitting the stored encryption key to the authentication server along with the authentication information that requests the authentication server to authenticate the remote access service.

The performing of the authentication may include transmitting a text for performing the authentication of the remote access service to the second device.

The performing of the authentication may include transmitting voice data generated by the first device to the second device, wherein the voice data is for receiving rights to share the content and remotely access the second device from the second device.

The performing of the authentication may include: generating information about a gesture input for the first device; and transmitting the information about the gesture to the second device.

The performing of the authentication may include: receiving an instruction to make a motion through a call from a user of the second device; moving the first device, based on the instruction; and generating information about the motion by using an operation sensor included in the first device.

The performing of the authentication may include: transmitting authentication information that requests the second device to authenticate the remote access service to the second device; and receiving the result of the authentication of the remote access service from the second device.

The method may further include checking information about networks which the second device may access through a mobile communication network used for call connection, wherein the remotely accessing the second device includes accessing the second device according to the information about the networks which the second device may access and the result of the authentication.

The sharing of the content may include: receiving information about devices connected to the second device from the second device based on the result of the authentication; displaying a list of the devices connected to the second device and selecting a third device to which the content is to be transmitted in the list; obtaining network information of the third device; accessing the third device by using the network information of the third device; and sharing the content with the third device.

The displaying of the list of the devices connected to the second device and the selecting of the third device with which the content is to be shared may include: selecting a device which may reproduce the content from among the devices connected to the second device; and displaying a list of the selected device.

The method may further include: displaying a list of pieces of content which the first device may share; and selecting content to be shared in the displayed list.

The selecting of the content may include: displaying the second device and a list of devices connected to the second device; and selecting the content based on a drag and drop event between the second device and the list of devices connected to the second device from the displayed list of pieces of content.

The content may be stored in at least one of the first device, a device connected to a network to which the first device belongs, and a cloud server.

The performing of the authentication may include: obtaining identification information about a user of the first device; and performing the authentication in further consideration of the identification information about the user of the first device.

According to another aspect of the present disclosure, there is provided an authentication method performed by a server to share content, the authentication method including: receiving information that requests a remote access service for sharing content with a second device to be authenticated from a first device; obtaining information about a call connection state between the first device and the second device; and performing authentication of rights of the first device to remotely access the second device and to share the content based on the information about the call connection state.

The performing of the authentication may further include transmitting information about a result of the authentication to the first device and the second device.

The performing of the authentication may include using the information about the call connection state between the first device and the second device as an encryption key for the authentication.

The performing of the authentication may include: obtaining information about whether a phone number of the second device is stored in the first device; and performing the authentication in further consideration of whether the phone number of the second device is stored.

The performing of the authentication may include: receiving voice data from the first device and the second device; and performing the authentication in further consideration of the received voice data.

The performing of the authentication may include: receiving information about a gesture input to each of the first device and the second device from the first device and the second device; and performing the authentication in further consideration of the received information about the gesture.

The performing of the authentication may include: receiving information about whether the authentication is acknowledged from the second device; and performing the authentication in further consideration about the information about whether the authentication is acknowledged.

According to another aspect of the present disclosure, there is provided a first device for sharing content, the first device including: an authentication unit that performs authentication of a remote access service for sharing the content on a second device based on a call connection state between the first device and the second device; and a content sharing unit that remotely accesses the second device based on a result of the authentication and shares the content with the second device based on the remote access.

The first device may further include a storage unit that stores a phone number, wherein the authentication unit performs the authentication of the remote access service in further consideration of whether a phone number of the second device is stored in the storage unit.

The first device may further include an information transmitting/receiving unit that transmits authentication information about the remote access service to a server and receives information about the result of the authentication from the server, wherein the authentication unit performs the authentication of the remote access service based on the result of the authentication received by the information transmitting/receiving unit.

The first device may further include a storage unit that stores an encryption key for the authentication, wherein when a phone number of the second device is stored in the storage unit, the information transmitting/receiving unit shares the stored encryption key with the server along with the authentication information.

The first device may further include an information transmitting/receiving unit that transmits a text for the authentication of the remote access service to the second device.

The first device may further include an information transmitting/receiving unit that shares voice data generated by the first device with the second device, wherein the voice data is for the authentication of the remote access service.

The first device may further include a gesture input unit that generates information about a gesture input for the first device, wherein the authentication unit generates authentication information including the information about the gesture.

The content sharing unit may include a network connection unit that checks information about networks which the second device may access through a mobile communication network used for call connection and is connected to the second device by using the information about the networks which the second device may access.

The content sharing unit may include a network connection unit that receives information about devices connected to the second device based on the remote access from the second device, selects a third device with which the content is to be shared from among the devices connected to the second device, and remotely accesses the selected third device, and shares the content with the third device.

According to another aspect of the present disclosure, there is provided an authentication server for sharing content, the authentication server including: a call connection state checking unit that obtains information about a call connection state between a first device and a second device; an authentication unit that performs authentication of a remote access service for sharing the content of the first device with the second device based on the information about the call connection state; and an authentication result transmitting unit that transmits information about a result of the authentication to the first device and the second device.

The authentication unit may use the information about the call connection state between the first device and the second device as an encryption key for the authentication.

The authentication unit may obtain information about whether a phone number of the second device is stored in the first device and perform the authentication in further consideration of whether the phone number of the second device is stored.

The authentication unit may receive voice data from the first device and the second device and perform the authentication in further consideration of the received voice data.

The authentication unit may receive information about a gesture input to each of the first device and the second device from the first device and the second device and perform the authentication in further consideration of the received information about the gesture.

The authentication unit may receive information about whether the authentication is acknowledged from the second device and perform the authentication in further consideration of whether the authentication is acknowledged.

According to another aspect of the present disclosure, there is provided a system for sharing content, the system including: a first device to store the content; a second device to receive the content; and a presence server to authenticate a remote access service for sharing content with the second device.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
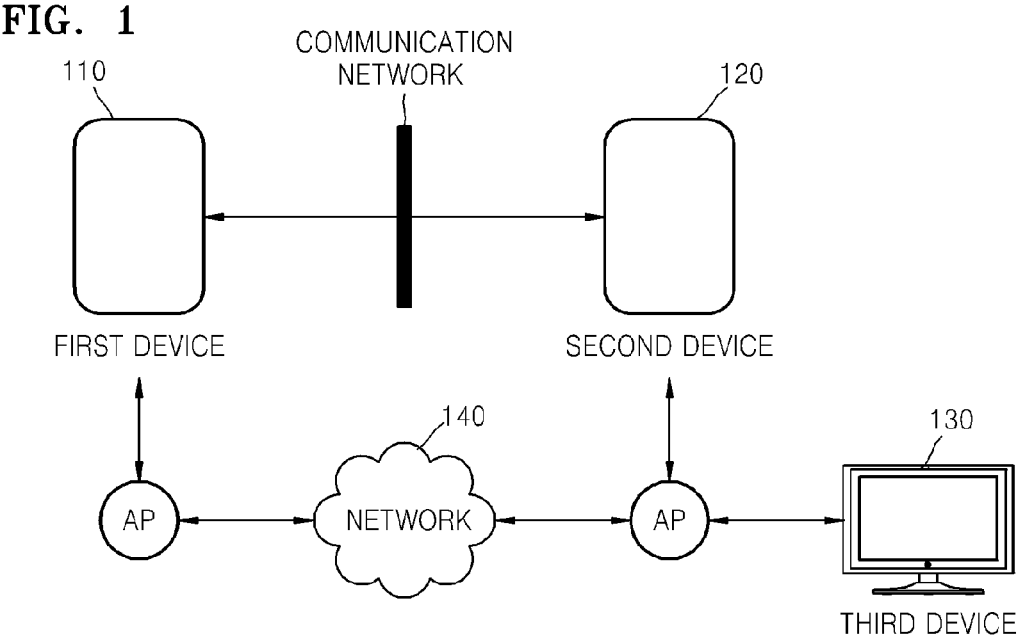
FIG. 1 is a diagram illustrating a system used by a first device to share content with a second device, according to an example embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Expressions such as "at least one of," when preceding a list of elements, modify the entire list of elements and do not modify the individual elements of the list.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather these embodiments are provided so that this disclosure will be thorough and complete, and will fully convey the concept of the disclosure to one of ordinary skill in the art. Also, parts in the drawings unrelated to the detailed description are omitted to ensure clarity of the present disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements. Also, it will be understood that when "content is transmitted", unless otherwise defined, it may mean that the content is shared and when "content is received", it may also mean that the content is shared.

The present disclosure will now be described more fully with reference to the accompanying drawings, in which exemplary embodiments of the disclosure are shown.

FIG. 1 is a diagram illustrating a system used by a first device 110 to share content with a second device 120, according to an example embodiment of the present disclosure.

The first device 110 may call the second device 120 over a communication network. Each of the first device 110 and the second device 120 may be a mobile phone which may make a call and communicate data to other devices, or an electronic device such as a tablet personal computer (PC), however, the present disclosure is not limited thereto.

The first device 110 may perform authentication for sharing content with the second device 120, and may remotely access the second device 120 through a network 140. The first device 110 may share the content with the second device 120 based on the remote access through network 140.

For example, while the first device 110 is calling the second device 120, a command to share content with a device which is being called, i.e., the second device 120, may be input to the first device 110. The first device 110 may request the second device 120 which is being called to authenticate a remote access service for sharing the content. The content to be shared with the second device 120 may be stored in the first device 110, in a device connected to the first device 110, or in a cloud server. The first device 110 may receive from the second device 120 information indicating that the authentication requested to the second device 120 has been completed and an Internet protocol (IP) address for accessing the second device 120. The first device 110 may remotely access the second device 120 through the Internet by using the IP address received from the second device 120. The first device 120 may transmit the content to the second device 120 and enable the content transmitted to the second device 120 to be displayed based on the remote access to the second device 120.

Also, the first device 110 may remotely access a third device 130, which is connected to a local network that is connected to the second device 120, to share the content with the third device 130.

For example, when the third device 130 is connected according to a digital living network alliance (DLNA) standard through the same access point (AP) as the second device 120, the first device 110 may receive information about the third device 130 connected to the second device 120 from the second device 120 which is being called. Next, the first device 110 may remotely access the third device 130 by using IP information of the third device 130 included in the received information about the third device 130. Additionally, other devices may be connected to the same AP as the second device 120 and the third device 130, and thus, the first device 110 may receive information about the other devices connected to the same AP as the second device 120.

Figure 2:
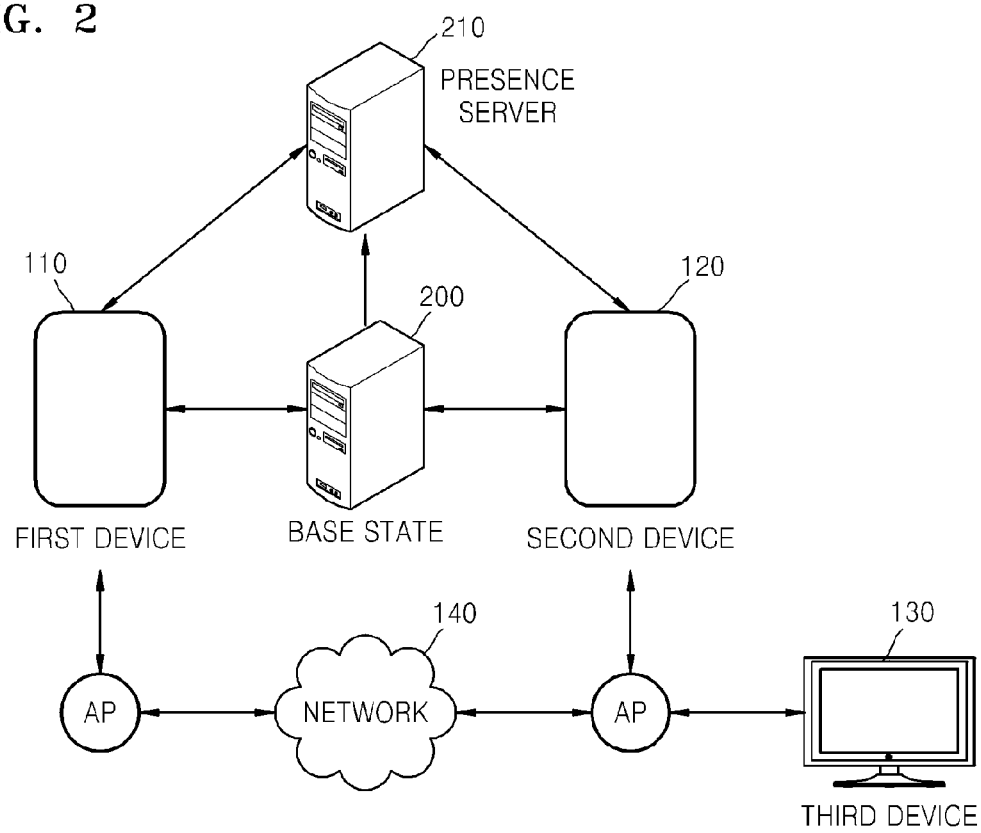
FIG. 2 is a diagram illustrating a system used by the first device to share content with the second device, according to another example embodiment of the present disclosure.

FIG. 2 is a diagram illustrating a system used by the first device 110 to share content with the second device 120, according to another example embodiment of the present disclosure.

While the first device 110 is calling the second device 120, the first device 110 may request a presence server 210 to authenticate a remote access service for sharing content with the second device 120. A server of a base station 200 may check a call connection state between the first device 110 and the second device 120. The presence server 210 may obtain information about the call connection state between the first device 120 and the second device 120 from the server of the base station 200. When it is determined that the first device 110 is calling the second device 120, the presence server 210 may transmit to the first device 110 and the second device 120 information about a result of the authentication indicating that the authentication has been completed.

The presence server 210 may transmit network information about the second device 120 to the first device 110. For example, the presence server 210 may transmit to the first device 110 IP information of the second device 120 stored in the presence server 210 or IP information received from the second device 120.

When receiving the information about the result of the authentication indicating that the authentication has been completed from the presence server 210, the first device 110 may transmit the content to the second device 120. The first device 110 may remotely access the second device 120 by using the network information received from the presence server 210, may transmit the content based on the remote access, and may control the second device 120 to reproduce or display the content.

Although the presence server 210 and the server of the base station 200 are separately shown in FIG. 2, the presence server 210 and the server of the base station 200 may not necessarily be separated, and may constitute one server. The term "server" used herein may refer to an authentication server.

Figure 3:
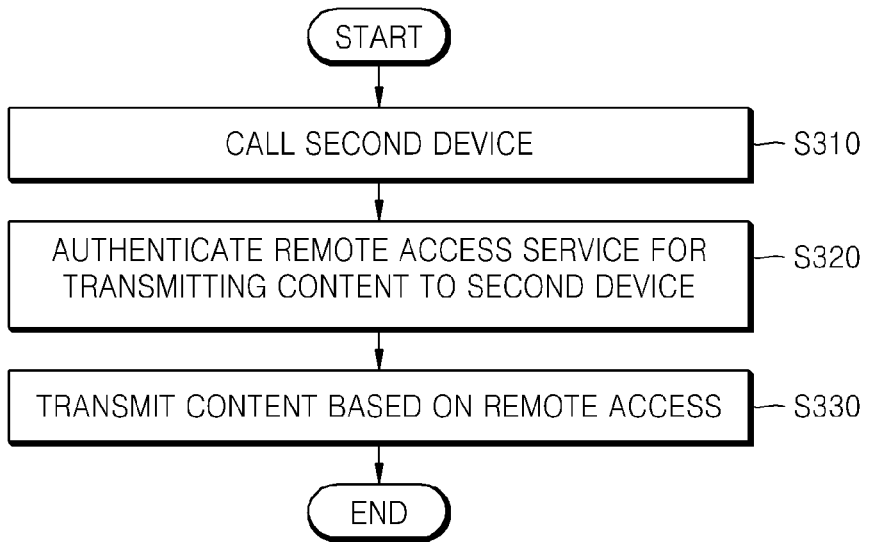
FIG. 3 is a flowchart illustrating a process performed by the first device to share content with the second device, according to an example embodiment of the present disclosure.

FIG. 3 is a flowchart illustrating a process performed by the first device 110 to share content with the second device 120, according to an example embodiment of the present disclosure.

In operation S310, the first device 110 may call the second device 120 over a communication network. Next, in operation S320, the first device 110 may perform authentication of a remote access service for sharing content on or with the second device 120 which is being called.

For example, the first device 110 may transmit information that requests the second device 120 to authenticate the remote access service to the second device 120 which is being called. The first device 110 may receive information about a result of the authentication performed by the second device 120 according to the information that requests the second device 120 to authenticate the remote access service. When the first device 110 receives the information about the result of the authentication from the second device 120, the first device 110 may complete the authentication of the remote access service.

Alternatively, depending on embodiments, the first device 110 may transmit authentication information to a server. The authentication information may include information that requests the second device 120 to authenticate the remote access service based on a call connection state. For example, the authentication information may include at least one of identification information of the first device 110, identification information of the second device 120, and identification information of the remote access service. The first device 110 may receive information about a result of the authentication based on the call connection state between the first device 110 and the second device 120 from the server. When the first device 110 has received the information about the result of the authentication, the first device 110 may complete the authentication of the remote access service.

Alternatively, depending on embodiments, when the first device 110 performs authentication for sharing content while calling the second device 120, the first device 110 may obtain an image by driving a photographing unit included in the first device 110. The first device 110 may transmit the image obtained by the photographing unit to the second device 120. The second device 120 may obtain and display the image, and may receive an input about whether authentication is acknowledged from a user. That is, for example, when a face of a user of the first device 110 is photographed and is displayed on the second device 120, a user of the second device 120 may check the face of the user of the first device 110 and may input about whether authentication is acknowledged.

Alternatively, depending on embodiments, the first device 110 may display a list of pieces of content which may be shared while calling the second device 120. When the first device 110 transmits content to the second device 120, the pieces of content which may be shared may be content that is stored in the first device 110, in a device connected to the first device 110, or in a cloud server. Also, when the first device 110 receives content, the pieces of content which may be shared may be content stored in the second device 120, in a device connected to the second device 120, or the cloud server. The first device 110 may select content to be shared, among the pieces of content available for sharing, with the second device 120 from the displayed list of pieces of content. For example, the first device 110 may select some in the list of pieces of content as shown in list 1500 of FIG. 15.

Also, the first device 110 may further obtain identification information about the user of the first device 110, and may perform authentication in further consideration of the identification information about the user.

For example, the first device 110 may perform a login operation by using an ID or a password stored in the first device 110 or received as an input from the user. Next, when the first device 110 requests a server 1400 (shown in FIG. 14) to authenticate a remote access service, the first device 110 may transmit a session ID for a login session to the server

1400. The server 1400 may perform authentication according to the authentication request when the login session corresponding to the session ID is maintained.

Next, in operation S330, the first device 110 may remotely access the second device 120 based on a result of the authentication, and may transmit the content to the second device 120 based on the remote access to the second device 120.

For the remote access to the second device 120, the first device 110 may obtain network information about the second device 120 when the authentication of the remote access service has been completed. The first device 110 may remotely access the second device 120 based on the network information about the second device 120 after the authentication of the remote access service has been successful. The network information may include information used by the first device 110 to access the second device 120.

For example, while the first device 110 is calling the second device 120, the first device 110 may display a list of pieces of content stored in the first device 110. For example, the list of pieces of content may be the list 1500 of FIG. 15. The first device 110 may select content to be shared with the second device 120 which is being called from the displayed list of pieces of content. The first device 110 may transmit a request to the second device 120 for authenticating a remote access service for sharing the selected content with the second device 120. When the second device 120 which is requested to authenticate the remote access service is being called, the second device 120 may transmit to the first device 110 information indicating that the authentication of the remote access service has been completed. As the authentication of the remote access service has been completed, the second device 120 may transmit network information including an IP address of the second device 120 to the first device 110. The first device 110 may then remotely access the second device 120 by using the IP address of the second device 120 that was received from the second device 120. The first device 110 may transmit the selected content to the second device 120 which is remotely accessed, and may enable the content transmitted to the second device 120 to be outputted or displayed.

Figure 14:
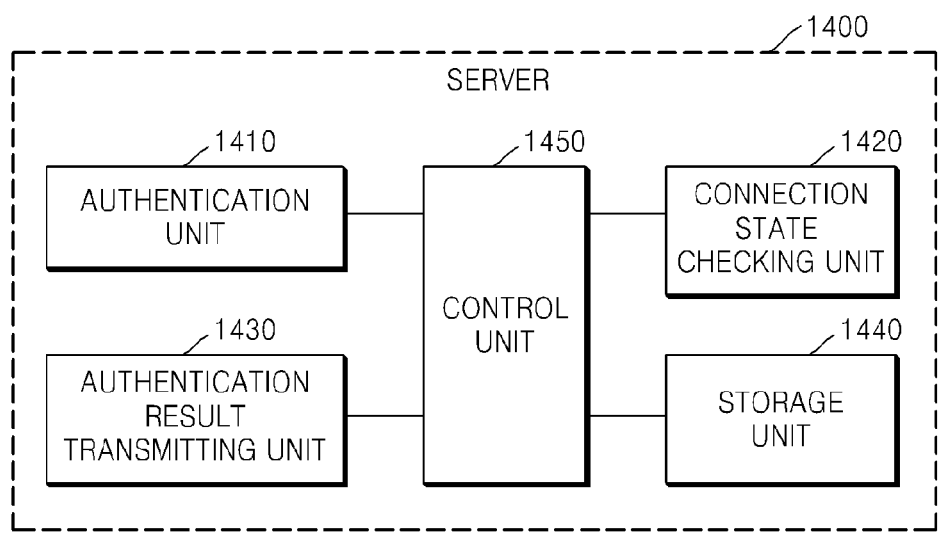
FIG. 14 is a block diagram illustrating the server, according to an embodiment of the present disclosure.

Alternatively, depending on embodiments, when the first device 110 is calling the second device 120, the first device 110 may display a list of pieces of content stored in the cloud server. For example, the list of pieces of content may be the list 1500 of FIG. 15. The first device 110 may select content to be shared with the second device 120 which is being called from the displayed list of pieces of content. The first device 110 may transmit a request to the server 1400 to authenticate a remote access service for sharing the selected content with the second device 120. The server 1400 which is requested to authenticate the remote access service may check whether the first device 110 is calling the second device 120 through a connection state checking unit 1420 included in the server 1400 (as shown in FIG. 14) or the server of the base station 200. When it is determined that the first device 110 is calling the second device 120, the server 1400 may transmit to the first device 110 and the second device 120 information indicating that the authentication of the remote access service has been completed. As the authentication has been completed, the server 1400 may receive an IP address of the second device 120 from the second device 120. The server 1400 may transmit the IP address of the second device 120 to the first device 110. The first device 110 may then remotely access the second device 120 by using the IP address of the second device 120, which was received from the server 1400. The first device 110 may request the cloud server to transmit the selected content to the second device 120 which is remotely accessed, and may enable the content transmitted to the second device 120 to be outputted or displayed.

Alternatively, depending on embodiments, the first device 110 may remotely access the third device 130, which is connected to the second device 120, and may share content with the third device 130. The third device 130 may be a device connected to a home network or a local network (or to the same AP as the second device 120) which the second device 120 accesses. For example, when the second device 120 is a mobile phone, the third device 130 may be a television connected according to a DLNA standard through the same access point as the mobile phone. However, the above description of the second device 120 and the third device 130 are examples, and thus, the present disclosure is not limited thereto.

Alternatively, depending on embodiments, the third device 130 may be a device which is directly connected to the second device 120. For example, the third device 130 may be a device which is connected to the second device 120 according to a Wi-Fi direct standard. Alternatively, the third device 130 may be a device connected according to any of other standards such as Bluetooth, Zigbee, or ultra WideBand (UWB). However, the present disclosure is not limited to the Bluetooth, Zigbee, or UWB standards.

For example, in accordance with example embodiments of the present disclosure, while a daughter is calling her mother using a mobile phone, a moving picture stored in the mobile phone of the daughter may be reproduced on a television connected to a mobile phone of the mother.

Figure 4:
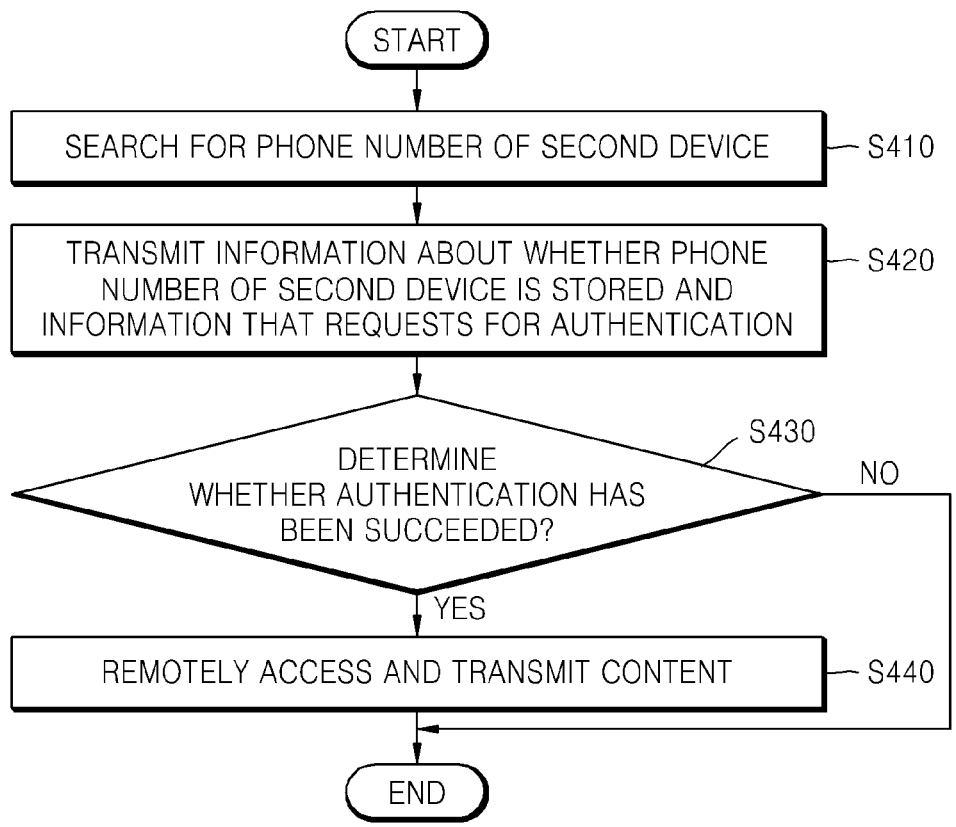
FIG. 4 is a flowchart illustrating a process of performing authentication in consideration of whether a phone number of the second device is stored in the first device, according to an example embodiment of the present disclosure.

FIG. 4 is a flowchart illustrating a process of performing authentication in consideration of whether a phone number of the second device 120 is stored in the first device 110, according to an example embodiment of the present disclosure.

In operation S410, the first device 110 may search for a phone number of the second device 120 in the first device 110 in order to authenticate a remote access service. The remote access service is a service for accessing the second device 120 to transmit and reproduce content.

Next, in operation S420, the first device 110 may transmit information that requests the second device 120 or the server 1400 (refer to FIG. 14) to authenticate the remote access service and information about whether the phone number of the second device 120 is stored in the first device 110.

Next, the first device 110 may receive information about a result of the authentication from the second device 120 or the server 1400. It is determined in operation S430 whether the authentication of the remote access service has succeeded. When it is determined in operation S430 that the authentication of the remote access service has succeeded, the process proceeds to operation S440. In operation S440, the first device 110 may remotely access the second device 120 and may transmit content to the second device 120. When it is determined in operation S430 that the authentication of the remote service has not succeeded, then the process ends.

That is, as long as the phone number of the second device 120 which is being called by the first device 110 is stored in the first device 110, content may be shared.

Figure 5:
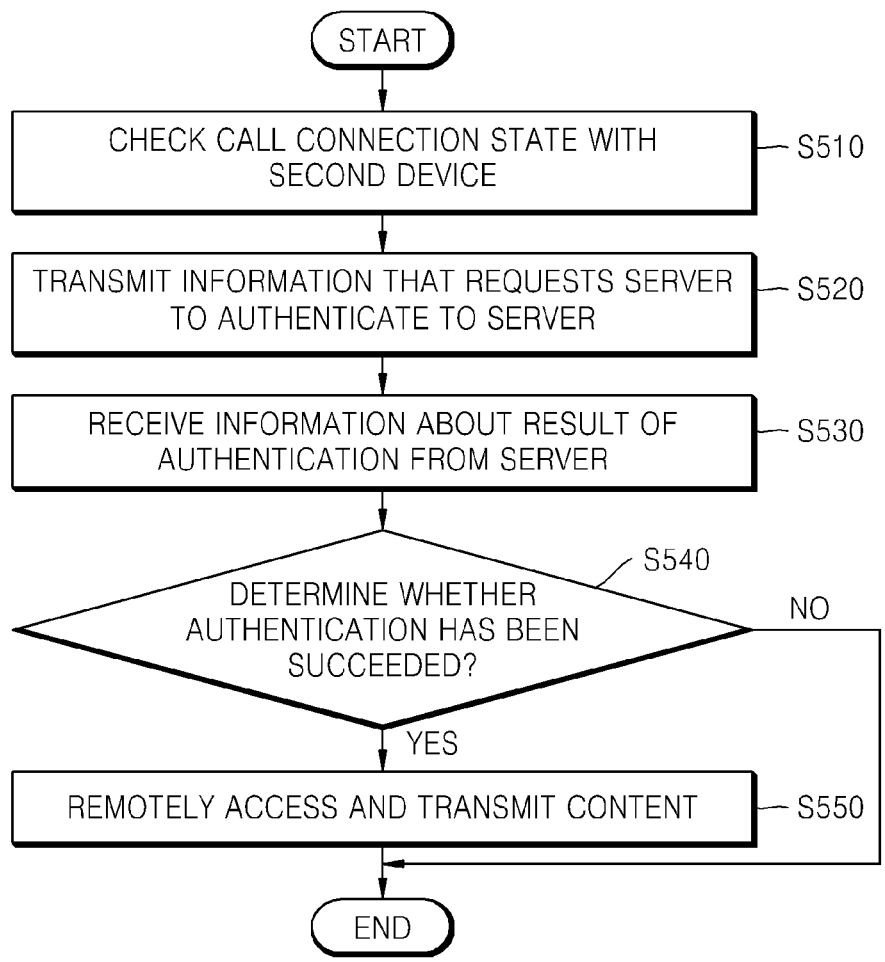
FIG. 5 is a flowchart illustrating a process performed by the first device to perform authentication through a server, according to an example embodiment of the present disclosure.

FIG. 5 is a flowchart illustrating a process performed by the first device 110 to perform authentication through the server 1400, according to an example embodiment of the present disclosure.

In operation S510, the first device 110 may check a call connection state with the second device 120. For example, the first device 110 may check whether a device is being called through a call application included in the first device 110 and a phone number of the device which is being called. The first device 110 may identify the second device 120 by using the phone number.

The first device 110 may determine the second device 120 as a device to share content with based on the call connection state with the second device 120.

Next, in operation S520, the first device 110 may transmit authentication information that requests the server 1400 to authenticate a remote access service for sharing content with the second device 120 to the server 1400.

The server 1400 may receive information about whether the phone number of the second device 120 is stored in the first device 110 from the first device 110 along with the authentication information. The server 1400 may use the information about whether the phone number of the second device 120 is stored in the first device 110 as an encryption key in the remote access service.

Further, the first device 110 may check whether the phone number of the second device 120 is stored in the first device 110. When it is determined that the phone number of the second device 120 is stored in the first device 110, the first device 110 may transmit an encryption key stored in the first device 110 along with the authentication information that requests the server 1400 to authenticate the remote access service to the server 1400.

Next, in operation S530, the first device 110 may receive information about a result of the authentication of the second remote access service from the server 1400. In operation S540, it is determined whether the authentication of the remote access service has succeeded. When it is determined in operation S540 that the authentication of the remote access service has succeeded, the first device 110 may receive network information about the second device 120. The first device 110 may remotely access the second device 120 based on the received network information.

When it is determined in operation S540 that the authentication of the remote access service has succeeded, the process proceeds to operation S550. In operation S550, the first device 110 may remotely access the second device 120 and may transmit content to the second device 120 to be outputted or displayed on the second device 120.

Figure 6:
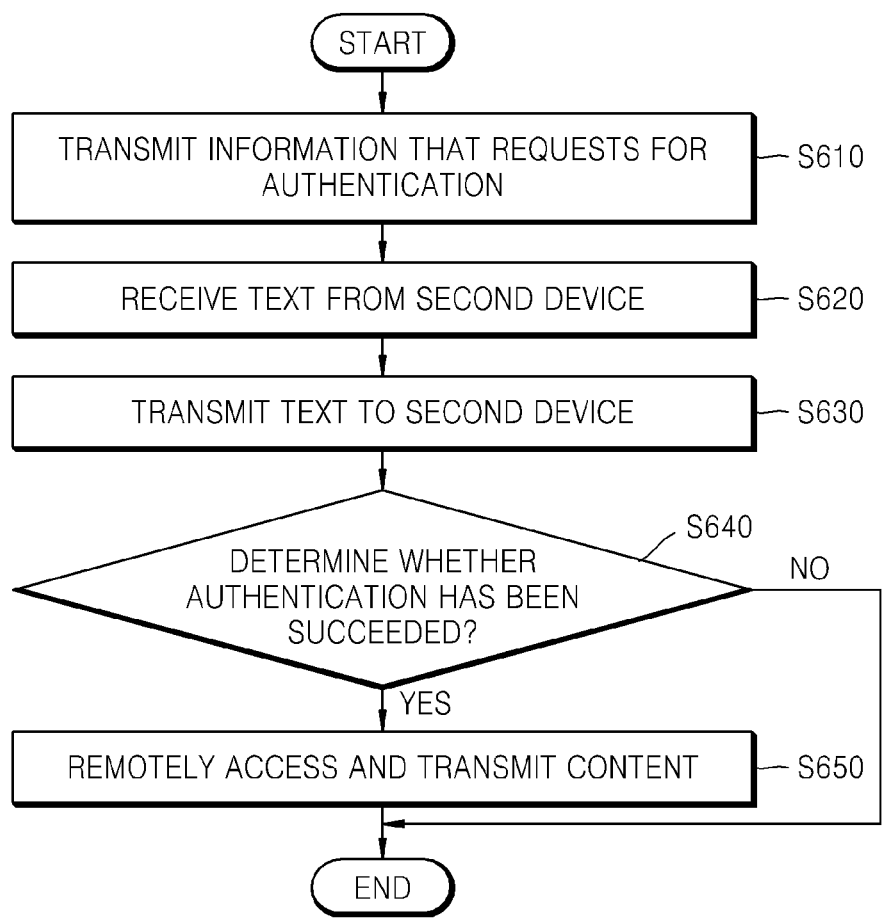
FIG. 6 is a flowchart illustrating a process performed by the first device to perform authentication in further consideration of a text transmitted/received to/from the second device, according to an example embodiment of the present disclosure.

FIG. 6 is a flowchart illustrating a process performed by the first device 110 to perform authentication in further consideration of a text transmitted/received to/from the second device 120, according to an example embodiment of the present disclosure.

In operation S610, the first device 110 may transmit information that requests the second device 120 or the server 1400 to authenticate a remote access service to the second device 120 or the server 1400. Also, in operation S620, the first device 110 may receive a text from the second device 120.

Next, in operation S630, the first device 110 may transmit a text for authenticating the remote access service to the second device 120.

For example, the first device 110 may receive a text including a question about the user of the first device 110, may receive a text including an answer to the question from or input by the user of the first device 110, and transmit the text to the second device 120. The second device 120 may display the text received from the first device 110, and may enable whether the user of the second device 120 checks and authenticates the text to be input to the second device 120.

Alternatively, depending on embodiments, the text received by the second device 120 may be compared with a preset answer, and when the received text and the preset answer are the same, authentication may be performed.

Next, in operation S640, it is determined whether the authentication of the remote access service has succeeded. When it is determined in operation S640 that the authentication of the remote access service has succeeded, the process proceeds to operation S650. In operation S650, the first device 110 may remotely access the second device 120 and may transmit content to the second device 120. When it is determined in operation S640 that the authentication of the remote access service has not succeeded, then the process ends.

Figure 7:
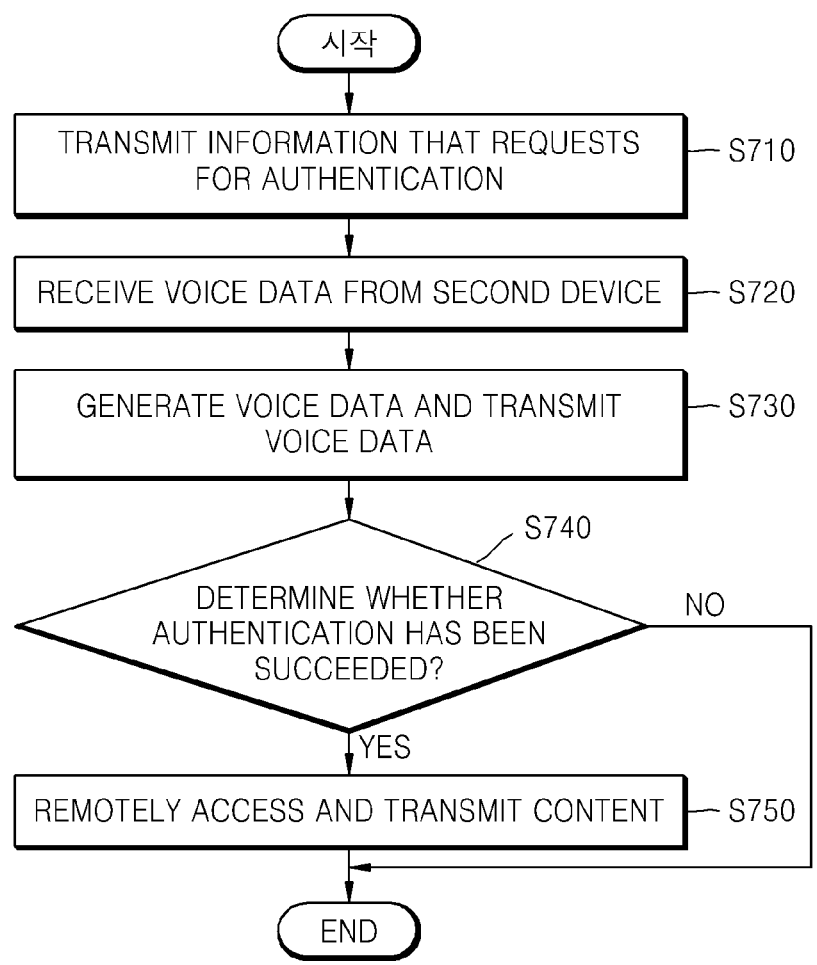
FIG. 7 is a flowchart illustrating a process performed by the first device to perform authentication in further consideration of voice data transmitted/received to/from the second device, according to an example embodiment of the present disclosure.

FIG. 7 is a flowchart illustrating a process performed by the first device 110 to perform authentication in further consideration of voice data transmitted/received to/from the second device 120, according to an example embodiment of the present disclosure.

In operation S710, the first device 110 may transmit information that requests the second device 120 or the server 1400 to authenticate a remote access service to the second device 120 or the server 1400. Also, in operation S720, the first device 110 may receive voice data from the second device 120. In operation S730, the first device 110 may generate voice data and may transmit the generated voice data to the second device 120 or the server 1400.

The second device 120 or the server 1400 may perform authentication in further consideration of the received voice data. For example, the user of the second device 120 may ask a question to the user of the first device 110 through a voice call, and the user of the first device 110 may answer the question through the voice call. The second device 120 may output the received voice data, may receive an input about whether authentication is to be performed from the user, and perform the authentication. Alternatively, when the received voice data is recognized and is the same as a preset answer, the authentication may be performed.

In operation S740, it is determined whether the authentication has succeeded when the first device 110 receives a result of the authentication from the second device 120 or the server 1400. When it is determined that the authentication has succeeded, the process proceeds to operation S750. In operation S750, the first device 110 may remotely access the second device 120, and may transmit content to the second device 120. When it is determined that the authentication has not succeeded, the process ends.

Figure 8:
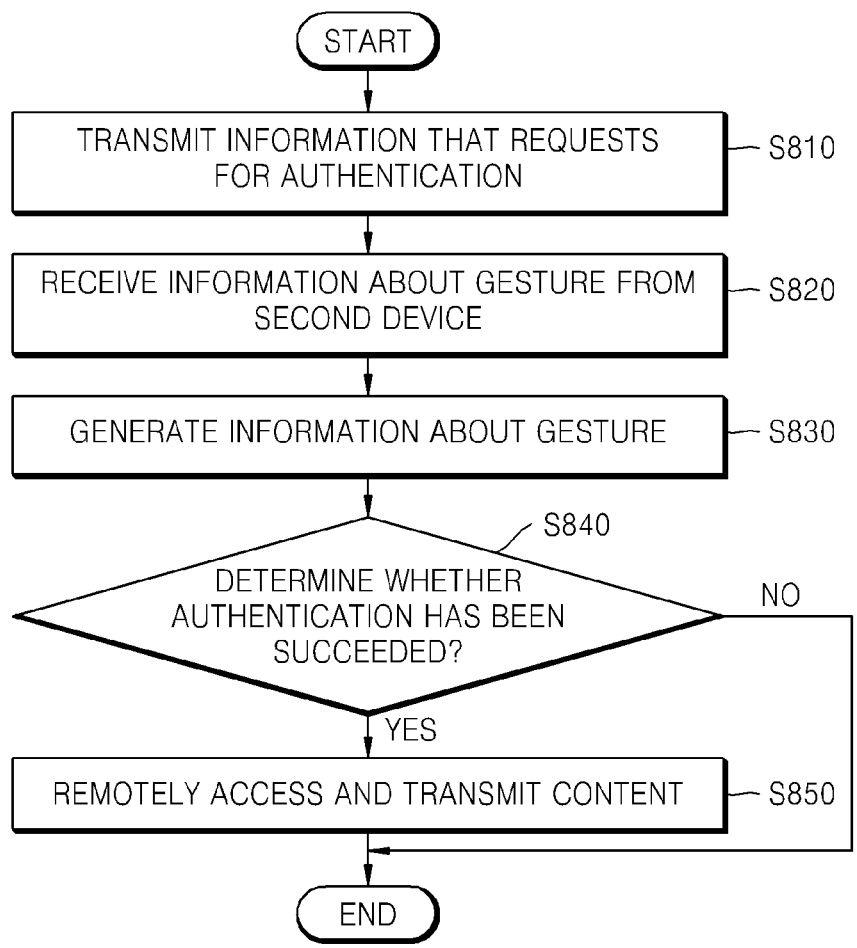
FIG. 8 is a flowchart illustrating a process of performing authentication in further consideration of information about a gesture input to the first device, according to an example embodiment of the present disclosure.

FIG. 8 is a flowchart illustrating a process of performing authentication in further consideration of information about a gesture input to the first device 110, according to an example embodiment of the present disclosure.

In operation S810, the first device 110 may transmit information that requests the second device 120 or the server 1400 to authenticate a remote access service to the second device 120 or the server 1400.

Next, in operation S820, the first device 110 may receive information about a gesture from the second device 120 or the server 1400. Operation S820 is not essential and thus may be omitted.

Next, in operation S830, the first device 110 may generate information about the gesture, and transmit the generated information about the gesture to the second device 120 or the server 1400. For example, when the user of the first device 110 who has received an instruction to make a circular motion through a call from the user of the second device 120 moves the first device 110, the first device 110 may generate information about the circular motion by using an operation sensor included in the first device 110.

Next, the first device 110 may receive information about a result of the authentication of the remote access service in further consideration of the information about the gesture of the second device 120 or the server 1400. It is determined in operation S850 whether the authentication of the remote access service has succeeded. When it is determined in operation S850 that the authentication of the remote access service has succeeded, the process proceeds to operation S850. In operation S850, the first device 110 may remotely access the second device 120 and may transmit content to the second device 120. When it is determined in operation S850 that the authentication of the remote access service has not succeeded, then the process may end.

Figure 9:
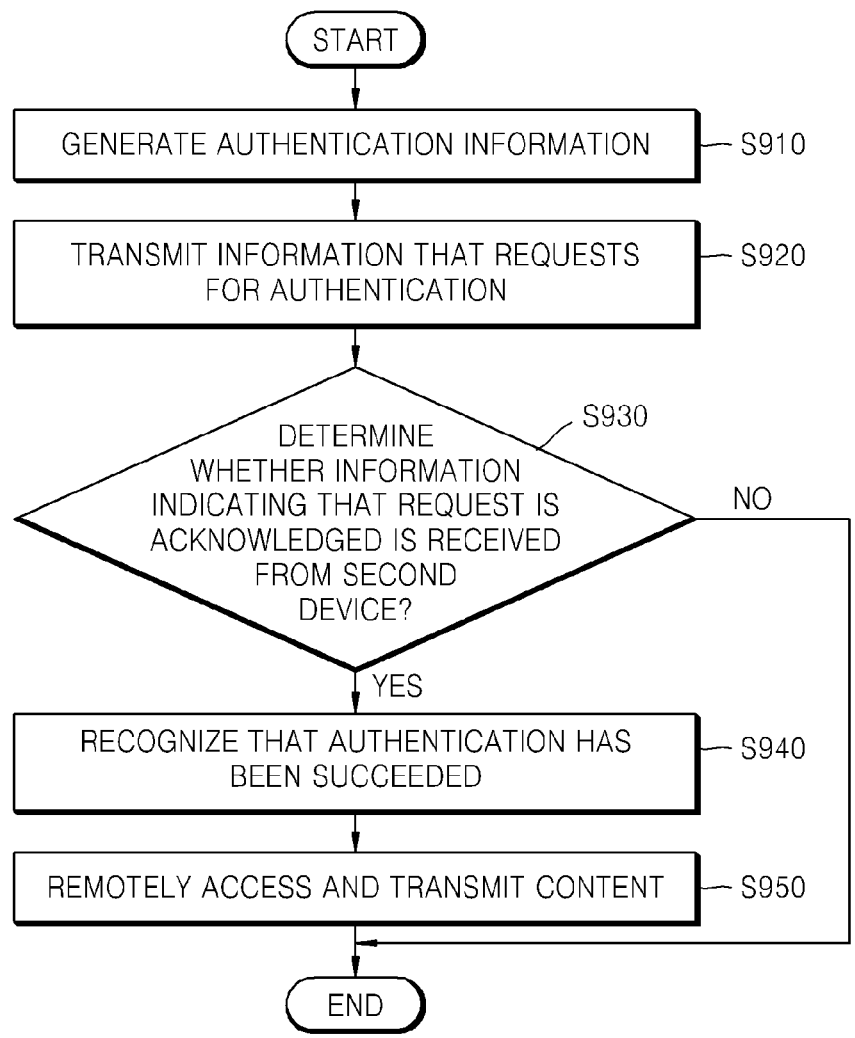
FIG. 9 is a flowchart illustrating a process performed by the first device to perform authentication with the second device, according to an example embodiment of the present disclosure.

FIG. 9 is a flowchart illustrating a process performed by the first device 110 to perform authentication with the second device 120, according to an example embodiment of the present disclosure.

In operation S910, the first device 110 may generate authentication information. The authentication information may include at least one of information for identifying the first device 110, information for identifying the second device 110, information about a call connection state between the first device 110 and the second device 120, and information that requests a remote access service to be authenticated. The information for identifying each of the first device 110 and the second device 120 may be identification information assigned to each device such as a media access control (MAC) address or a phone number of each of the first device 110 and the second device 120. The above examples of authentication information are examples, and thus, the present disclosure is not limited thereto.

Next, in operation S920, the first device 110 may transmit information that requests the second device 120 to authenticate a remote access service to the second device 120. The information that requests the second device 120 to authenticate the remote access service may be included in the authentication information and may be transmitted along with other information.

Next, in operation S930, it is determined whether the first device 110 receives information indicating that the request of the first device 110 (transmitted in S920) is acknowledged from the second device 120 as a result of the authentication performed by the second device 120. When it is determined in operation S930 that the first device 110 receives the information indicating that the request of the first device 110 is acknowledged from the second device 120, the process proceeds to operation S940. In operation S940, the first device 110 may recognize that the authentication has succeeded.

In operation S950, the first device 110 may remotely access the second device 120 and may transmit content to the second device 120.

Figure 10:
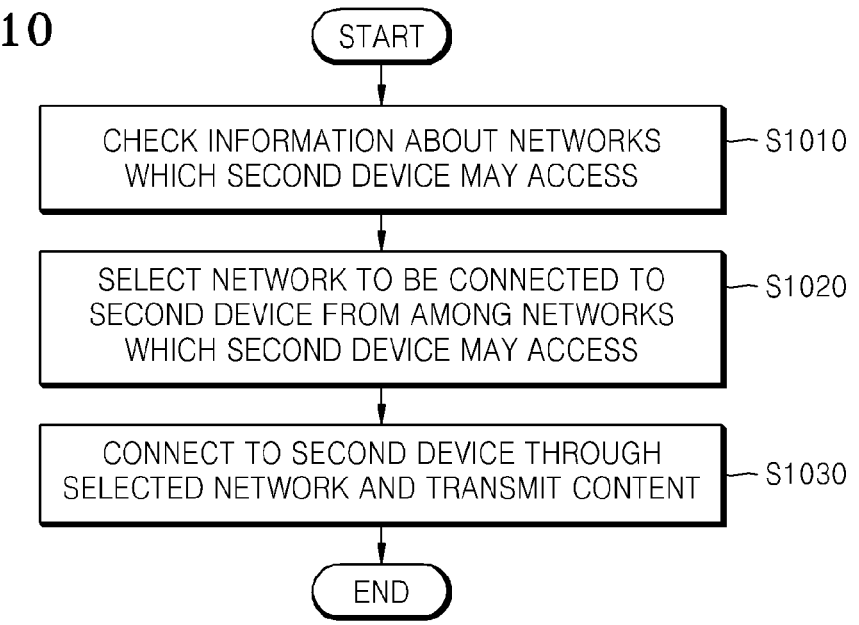
FIG. 10 is a flowchart illustrating a process performed by the first device to be connected to the second device through a network, according to an example embodiment of the present disclosure.

FIG. 10 is a flowchart illustrating a process performed by the first device 110 to be connected through a network to the second device 120, according to an example embodiment of the present disclosure.

When authentication of a remote access service is completed (or when authentication has succeeded), the first device 110 may check information about networks which the second device 120 may access, in operation S1010. The first device 110 may receive network information including the information about the networks which the second device 120 may access from the second device 120.

Next, in operation S1020, the first device 110 may select a network to be connected to the second device 120 through remote access from among the networks which the second device 120 may access. In operation S1030, the first device 110 may be connected to the second device 120 through the selected network. As a non-limiting example, the first device 110 may receive from the second device 120 a list of networks including the Internet and a mobile communication network using a code division multiple access (CDMA) method which the second 120 may access. Next, the first device 110 may select the Internet, and may remotely access the second device 120 by using the Internet.

In addition, the first device 110 may display a list of networks, and may select a network used to be connected to the second device 120 by receiving the user's input. Alternatively, depending on embodiments, the first device 110 may select a network according to a priority preset to each network from among the networks which the second device 120 may access.

Figure 11:
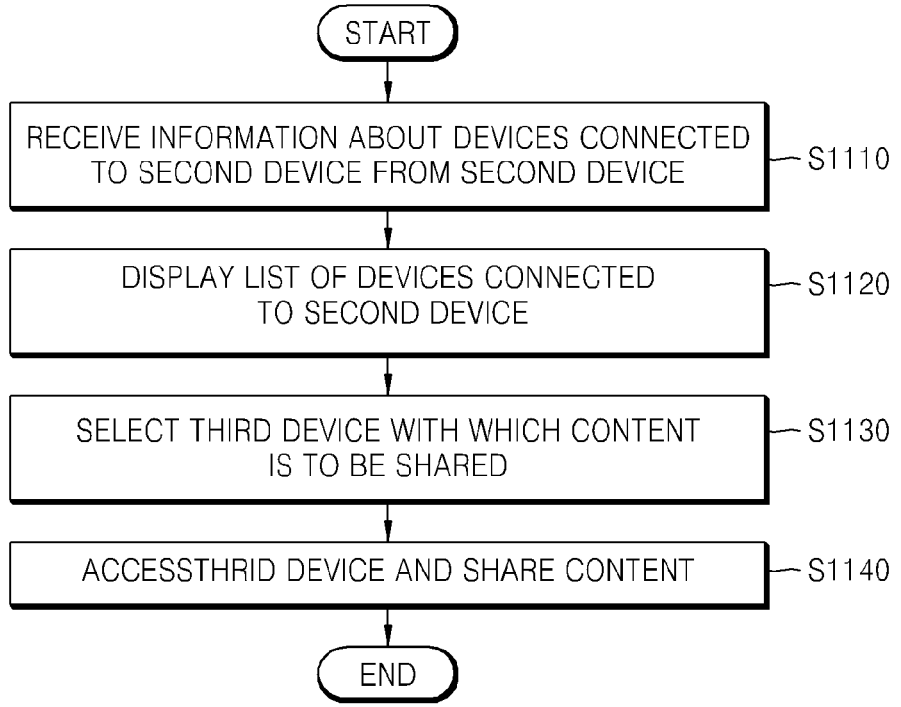
FIG. 11 is a flowchart illustrating a process performed by the first device to share content with a third device connected to the second device, according to an example embodiment of the present disclosure.

FIG. 11 is a flowchart illustrating a process performed by the first device 110 to share content with the third device 130 connected to the second device 120, according to an example embodiment of the present disclosure.

When authentication of a remote access service is completed (or when authentication has succeeded), the first device 110 may receive a list of devices connected to the second device 120 from the second device 120, in operation S1110. The devices connected to the second device 120 may be devices connected to a home network or a local network to which the second device 120 is connected. Also, the devices connected to the second device 120 may be devices that are connected to the same AP as the second device 120.

Next, in operation S1120, the first device 110 may display the list of devices connected to the second device 120. For example, the first device 110 may display the list of devices connected to the second device 120 as shown in a list 1510 of FIG. 15 or 1600 of FIG. 16. Also, the list of devices connected to the second device 120 may include the second device 120.

Further, in the list of devices connected to the second device 120, the first device 110 may display only devices which are capable of reproducing or which may reproduce the content selected to be shared by the first device 110 in the list of devices connected to the second device 120. For example, when a television and an audio device are connected to the second device 120 and the content which the first device 110 is to share with the second device 120 is a moving picture, the first device 110 may display only the television in the list because the television may reproduce the moving picture and the audio device may not be able to reproduce the moving picture.

Figure 16:
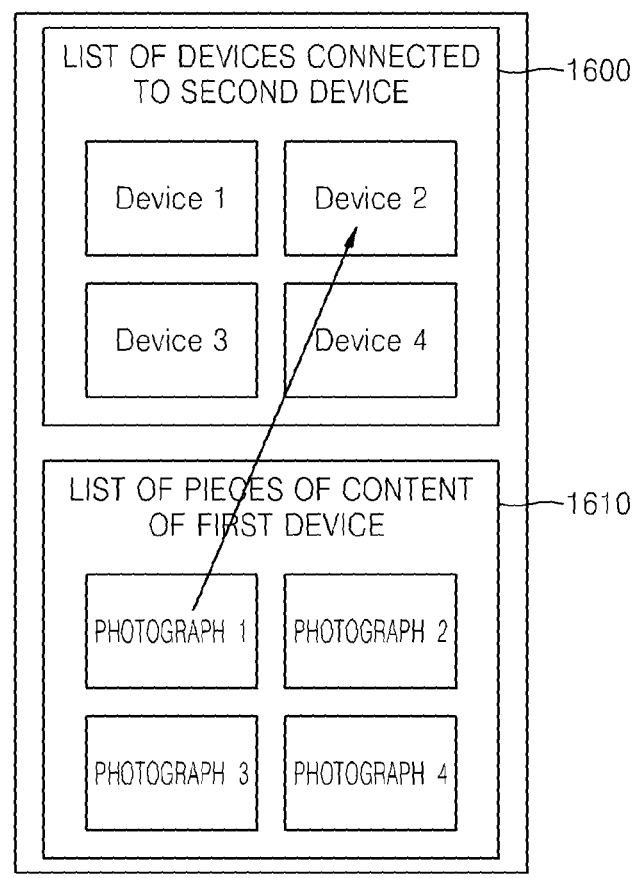
FIG. 16 is a diagram illustrating content to be shared by a first device and a user interface for selecting a device connected to the second device which is to receive the content, according to an example embodiment of the present disclosure.

Next, in operation S1130, the first device 110 may select the third device 130 with which content is to be shared from among the devices connected to the second device 120. The first device 110 may display a list of pieces of content which may be shared and a list of devices connected to the second device 120. Further, the first device 110 may select content to be shared from the list of pieces of content and may select the third device 130 with which the content is to be shared from the list of devices connected to the second device 120. For example, the first device 110 may select content to be shared and the third device 130 with which the content is to be shared according to an input by dragging and dropping the content to be shared to an item included in the list of devices connected to the second device 120, as shown in FIG. 16.

The first device 110 may receive the list 1600 (of FIG. 16) of devices connected to the second device 120 from the second device 120 which is being called, and may display the received list 1600 of devices connected to the second device 120. Also, the first device 110 may display a list 1610 of pieces of content which the first device 110 may share with at least one device connected to the second device. Depending on embodiments, the selected content may be shared with more than one device that is connected to the second device 120.

Also, the first device 110 may check whether a drag and drop event occurs from an area that displays predetermined content in the list 1610 of pieces of content displayed on the first device 110 to an area that displays a predetermined device in the list 1600 of devices connected to the second device 120. The drag and drop event may be input through a curser included in a graphical user interface (GUI) displayed on the first device 110 or through an interactive display device, such as a touch-screen, however, the present disclosure is not limited thereto.

The first device 110 may select content to be shared and a device with which the content is to be shared according to the drag and drop event. For example, in FIG. 16, the first device 110 may transmit content corresponding to a 'photograph 1' to a device corresponding to a 'device 2' connected to the second device 120. The second device 120 may be a device which is being called by the first device 110.

In operation S1140, the first device 110 may remotely access the third device 130 and may transmit the content to the third device 130.

The first device 110 may receive network information for remotely accessing the third device 130 from the second device 120.

The network information for remotely accessing the third device 130 may be included in the list 1600 of devices connected to the second device 120.

Figure 12:
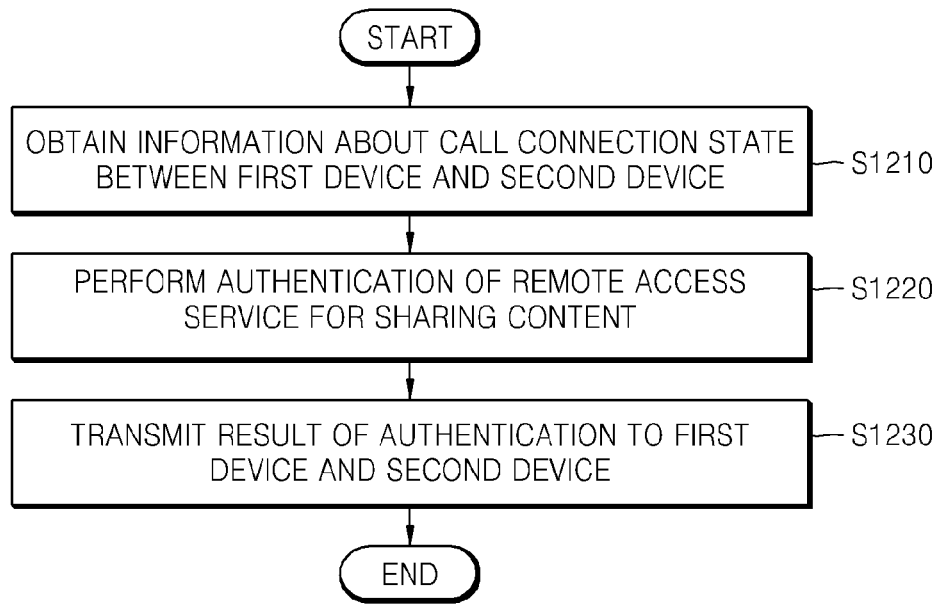
FIG. 12 is a flowchart illustrating a process performed by the server to perform authentication based on a call connection state between the first device and the second device, according to an example embodiment of the present disclosure.

FIG. 12 is a flowchart illustrating a process performed by the server 1400 to perform authentication based on a call connection state between the first device 110 and the second device 120, according to an example embodiment of the present disclosure.

When receiving a request of a remote access service, in operation S1210, the server 1400 may obtain information about a call connection state between the first device 110 and the second device 120. The server 1400 may receive the information about the call connection state from a server of a base station that relays the first device 110 and the second device 120. Alternatively, the server 1400 may obtain the information about the call connection state through the connection state checking unit 1420 included in the server 1400, as shown in FIG. 14.

Next, in operation S1220, the server 1400 may authenticate the remote access service for sharing content. Next, in operation S1230, the server 1400 may transmit a result of the authentication to the first device 110 and the second device 120. In this case, the server 1400 may transmit network information of the second device 120 to the first device 110.

Figure 13:
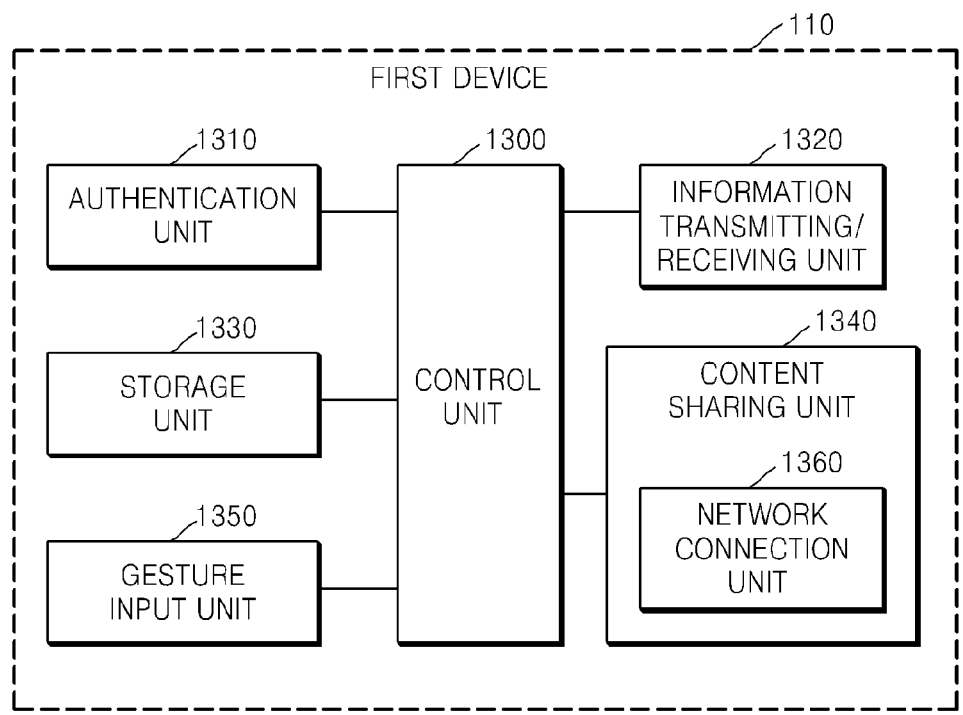
FIG. 13 is a block diagram illustrating the first device, according to an example embodiment of the present disclosure.

FIG. 13 is a block diagram illustrating the first device 110, according to an example embodiment of the present disclosure.

The first device 110 may include an authentication unit 1310 that performs authentication of a remote access service for transmitting content to the second device 120, an information transmitting/receiving unit 1320 that transmits/receives information, a content sharing unit 1340 that remotely accesses the second device 120 based on a result of the authentication and shares content with the second device 120 based on the remote access, and a control unit 1300 that controls each of the elements. At least one of the above-described units may include one or more processing devices. The first device 110 may additionally include a storage unit 1330 and a gesture unit 1350, depending on embodiments.

The second device 120 is a device which is being called by the first device 110. The authentication unit 1310 may perform authentication of a remote access service for sharing content with the second device 120 which is being called by the first device 110. The authentication unit 1310 may transmit authentication information about the remote access service through the information transmitting/receiving unit 1320 to the second device 120 or the server 1400. For example, the authentication information may include information for remotely accessing the second device 120 and information that requests the remote access service for sharing content to be authenticated. The authentication unit 1310 may perform authentication when receiving information about a result of the authentication based on a call connection state between the first device 110 and the second device 120 from the second device 120 or the server 1400. The information about the result of the authentication may be received through the information transmitting/receiving unit 1320. Also, the information transmitting/receiving unit 1320 may transmit/receive the information about the result of the authentication and the information that requests the remote access service to be authenticated through a mobile communication network.

Moreover, depending on embodiments, the first device 110 may further include a storage unit 1330 that stores a phone number, and the authentication unit 1310 may perform authentication of the remote access service in further consideration of whether a phone number of the second device 120 is stored in the storage unit 1330. The storage unit 1330 which may be a computer-readable recording medium included in a separate server or a storage medium included in the first device 110 may record a database including information about a phone number.

For example, the authentication unit 1310 may determine whether a phone number of the second device 120 which is being called is stored in the storage unit 1330. When the phone number of the second device 120 is stored in the storage unit 1330, the authentication unit 1310 may perform authentication of the remote access service.

Alternatively, depending on embodiments, the storage unit 1330 may store an encryption key for performing authentication of the remote access service. The authentication unit 1310 may determine whether a phone number of the second device 120 is stored in the storage unit 1330. When the authentication unit 1310 determines that the phone number of the second device 120 is stored in the storage unit 1330, the information transmitting/receiving unit 1320 may transmit the encryption key stored in the storage unit 1330 to the second device 120 or the server 1400 along with the authentication information. The encryption key may be included in the authentication information and then may be transmitted.

Alternatively, depending on embodiments, the information transmitting/receiving unit 1320 may transmit a text for performing authentication to the second device 120. An answer to a question transmitted to the user of the first device 110 through a call may be transmitted to the second device 120 through a text. The second device 120 may determine whether authentication of the remote access service is performed based on whether the received text and a text preset in the second device 120 are the same. When the received text from the first device 110 and the preset text of the second device 120 are the same, the second device 120 may transmit a result of the authentication including information indicating that the authentication is acknowledged to the first device 110.

As a non-limiting example, a name of the user of the second device 120 may be preset in the second device 120. The user of the second device 120 may request the name to be transmitted through a call by using a voice. The user of the first device 110 may transmit a text through a short message service (SMS). When the text included in the SMS and the name of the user preset in the second device 120 are the same, the first device 110 may receive information about a result of the authentication from the second device 120, thereby completing the authentication process.

Alternatively, depending on embodiments, the information transmitting/receiving unit 1320 may transmit voice data for performing authentication of the remote access service to the second device 120. An answer to a question transmitted to the user of the first device 110 through a call may be transmitted to the second device 120 through the voice data. The second device 120 may generate a text from the voice data through voice recognition. The second device 120 may determine whether authentication of the remote access service is to be performed based on whether the text generated from the voice data and a text preset in the second device 120 are the same. When the text generated from the voice data includes the preset text, the second device 120 may transmit a result of the authentication including information indicating that the authentication is acknowledged to the first device 110.

Alternatively, depending on embodiments, the first device 110 may further include a gesture input unit 1350 that generates information about a gesture. The information transmitting/receiving unit 1320 may transmit the information about the gesture along with the authentication information to the server 1400 or the second device 120. The authentication may be performed in further consideration of the information about the gesture by receiving information about a result of the authentication according to the information about the gesture from the server 1400 or the second device 120.

For example, the first device 110 may transmit to the server 1400 information about a gesture of holding the second device 120 and making a circular motion along with the authentication information, and the second device 120 may transmit to the server 1400 the information about a gesture of holding the second device 120 and making a circular motion along with the authentication information. The server 1400 may determine whether authentication is performed by determining a similarity between the information about the gesture received from the first device 110 and the information about the gesture received from the second device 120.

Also, the content sharing unit 1340 may include a network connection unit 1360 that remotely accesses the second device 120 when the authentication unit 1310 completes the authentication. The network connection unit 1360 may remotely access the second device 120 or the third device 130 based on network information about the second device 120 or the third device 130, respectively, connected to the second device 120 received from the server 1400 or the second device 120.

Also, the control unit 1300 may include a processor that controls each element.

FIG. 14 is a block diagram illustrating the server 1400, according to an example embodiment of the present disclosure.

The server 1400 may include an authentication unit 1410 that performs authentication when receiving an authentication request from the first device 110, a connection state checking unit 1420 that checks a call connection state between the first device 110 and the second device 120, an authentication result transmitting unit 1430 that transmits a result of the authentication performed by the authentication unit 1410 to the first device 110, a storage unit 1440 that stores information related to the authentication, and a control unit 1450 that controls each of the elements. At least one of the above-described units may include one or more processing devices.

The authentication request received from the first device 110 may include information for remotely accessing the second device 120 and an authentication request for a remote access service for sharing content with the second device 120.

The authentication unit 1410 may perform authentication according to the call connection state between the first device 110 and the second device 120 checked by the connection state checking unit 1420. Also, the authentication unit 1410 may perform authentication by using information about the call connection state checked by the connection state checking unit 1420 as an encryption key. That is, when the first device 110 is calling the second device 120, authentication may be performed according to the authentication request of the first device 110.

Alternatively, the authentication unit 1410 may obtain information about whether a phone number of the second device 120 is stored in the first device 110, and may perform authentication in further consideration of the information about whether the phone number of the second device 120 is stored in the first device 110. The authentication unit 1410 may check whether the first device 110 is calling the second device 120 through the connection state checking unit 1420. The authentication unit 1410 may receive the information about whether the phone number of the second device 120 is stored in the first device 110 from the first device 110. When the first device 110 is calling the second device 120 and the phone number of the second device 120 is stored in the first device 110, authentication may be performed according to the authentication request of the remote access service of the first device 110.

Alternatively, the authentication unit 1410 may receive voice data from the first device 110 and the second device 120. The authentication unit 1410 may perform authentication in further consideration of the voice data received from the first device 110 and the second device 120.

For example, the authentication unit 1410 may include a voice recognition unit that generates a text by using voice recognition from the voice data received from the first device 110 and the second device 120. The authentication unit 1410 may compare the voice data received from the first device 110 and the second device 120 with a text. Authentication may be performed in further consideration of whether the two texts are the same.

Alternatively, the authentication unit 1410 may receive information about a gesture from the first device 110 and the second device 120. The authentication unit 140 may compare the information about the gesture received from the first device 110 with the information about the gesture received from the second device 120. The authentication unit 1410 may perform authentication in further consideration of a result of the comparison of the information about the gesture.

Also, the authentication unit 1410 may receive information about whether an authentication request received from the first device 110 to the second device 120 is acknowledged. For example, the authentication unit 1410 may transmit information asking whether the authentication request is acknowledged to the second device 120, and the second device 120 may return the information about whether the authentication request is acknowledged according to the user's input to the server 1400. When receiving information indicating that the authentication request is acknowledged from the second device 120, the authentication unit 1410 may perform authentication of a remote access service.

Also, the connection state checking unit 1420 may check whether the first device 110 is calling the second device 120. The connection state checking unit 1420 may check whether the first device 110 is calling the second device 120 by directly relaying the first device 110 and the second device 120.

Alternatively, the connection state checking unit 1420 may receive information about a call connection state from the server of the base station 200 which relays the first device 110 and the second device 120.

Further, the authentication result transmitting unit 1430 may transmit information about a result of the authentication performed by the authentication unit 1410 to the first device 110. Also, the authentication result transmitting unit 1430 may transmit network information used by the first device 110 to access the second device 120 along with the information about the result of the authentication. The network information may be stored in the storage unit 1440 included in the server 1400, or may be received from the second device 120.

For example, when the authentication unit 1410 successfully completes authentication, the server 1400 may receive IP information of the second device 120 from the second device 120. The authentication result transmitting unit 1430 may transmit the received IP information of the second device 120 to the first device 110.

Moreover, the storage unit 1440 may include information for authentication of a remote access service and information used by the first device 110 to remotely access the second device 120. The information for the authentication of the remote access service may include an encryption key for performing authentication. The encryption key may include information about a call connection state between the first device 110 and the second device 120. Also, the information used by the first device 110 to remotely access the second device 120 may include network information about the second device 120.

Also, the control unit 1450 may include a processor that controls each element.

Figure 15:
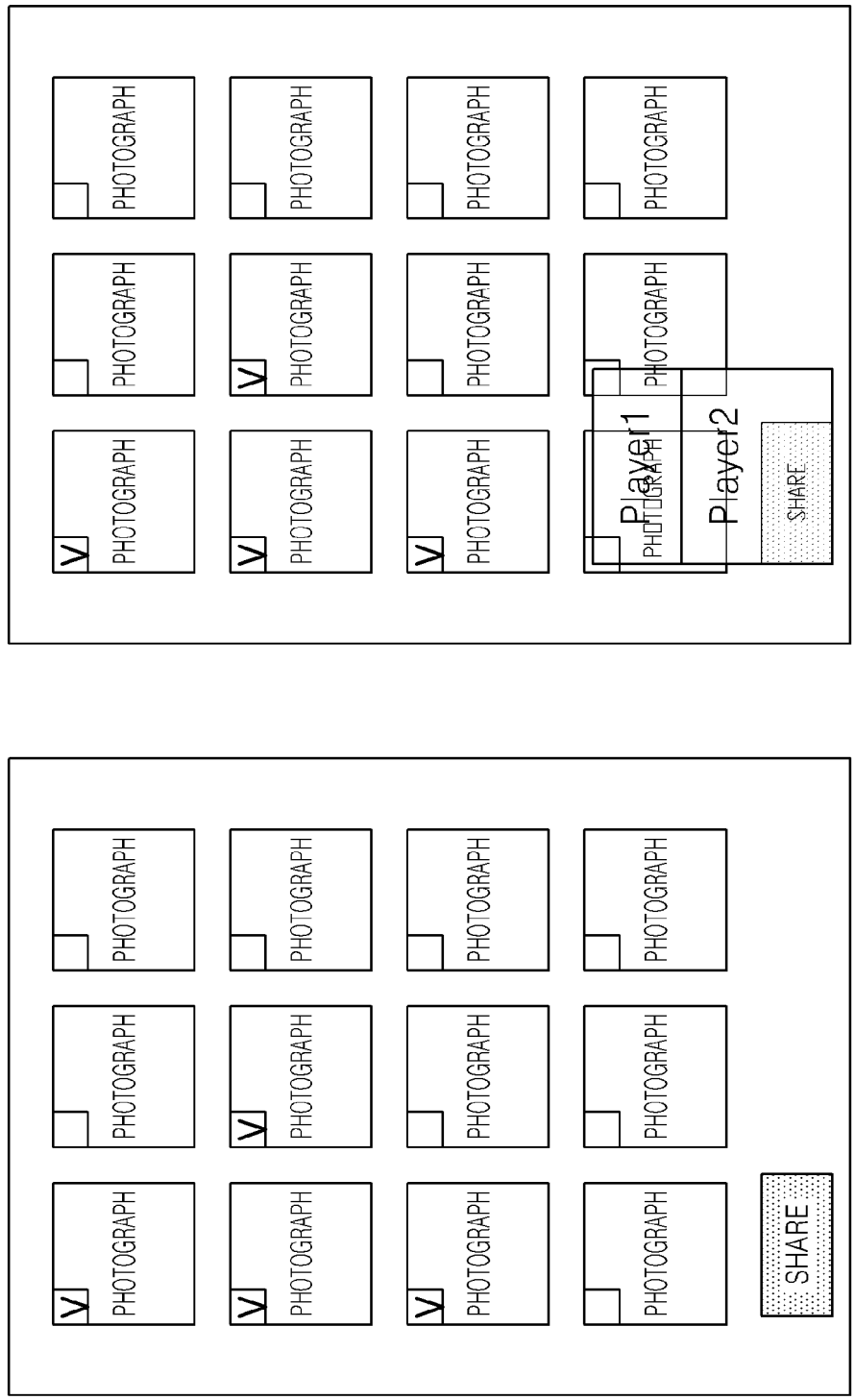
FIG. 15 is a diagram illustrating content a user interface for selecting a device with which the content is to be shared, according to an example embodiment of the present disclosure.

FIG. 15 is a diagram illustrating content and a user interface for selecting a device with which the content is to be shared, according to an example embodiment of the present disclosure.

Referring to FIG. 15, the first device 110 may display the list 1500 of pieces of content which the first device 110 may share. For example, list 1500 includes an array of photographs that are available for sharing with another device. Also, the first device 110 may select content to be shared through the user interface on which the list 1500 of pieces of content to be shared is displayed. For example, FIG. 15 shows that several of the photographs of list 1500 have been selected. When the first device 110 is calling the second device 120, the first device 110 may select content to be shared, may perform authentication by selecting a sharing button displayed on the user interface, and may transmit the selected content to the second device 120 by remotely accessing the second device 120.

Also, when content is selected and the sharing button is input, the second device 120 and the list 1510 of devices connected to the second device 120 may be displayed. The first device 110 may receive an input that selects a device in the displayed list 1510 from the list. When the device is selected in the list 1510, the first device 110 may perform authentication and may remotely access the selected device. The first device 110 may transmit content to the selected device which is remotely accessed.

FIG. 16 is a diagram illustrating content to be shared by the first device 110 and a user interface for selecting a device connected to the second device 120 with which the content is to be shared, according to an example embodiment of the present disclosure.

Referring to FIG. 16, the first device 110 may receive the list 1600 of devices connected to the second device 120 from the second device 120 which is being called, and may display the received list 1600 of devices connected to the second device 120. Also, the first device 110 may display a list 1610 of pieces of content which the first device 110 may share.

Also, the first device 110 may check whether a drag and drop event occurs from an area of displaying predetermined content in the list 1610 of pieces of content displayed on the first device 110 to an area of displaying a predetermined device in the list 1600 of devices. The drag and drop event may be input through a cursor included in a GUI displayed on the first device 110, or through an interactive display device such as a touch-screen.

The first device 110 may select content to be shared and a device with which the selected content is to be shared, according to the drag and drop event. For example, in FIG. 16, the first device 110 may transmit content corresponding to a 'photograph 1' to a 'device 2' connected to the second device 120. The second device 120 may be a device which is being called by the first device 110.

Figure 17:
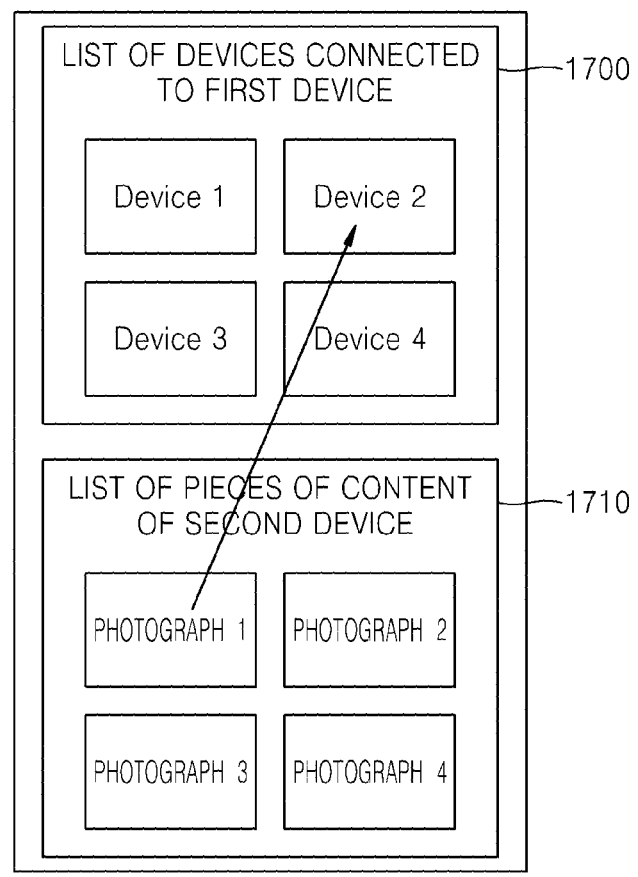
FIG. 17 is a diagram illustrating content of the second device to be received from the second device and a user interface for selecting a device connected to the first device which is to receive the content, according to an example embodiment of the present disclosure.

FIG. 17 is a diagram illustrating content of the second device 120 to be received from the second device 120 and a user interface for selecting a device connected to the first device 110 which is to receive the content, according to an example embodiment of the present disclosure.

Referring to FIG. 17, the first device 110 may display a list 1700 of devices connected to the first device 110. The devices connected to the first device 110 may include devices connected through a home network or a local network to the first device 110. Also, the devices connected to the first device 110 may include devices that are connected to the same AP as the first device.

Also, the first device 110 may receive a list 1710 of pieces of content which the second device 120 may share from the second device 120 or the server 1400. The first device 110 may display the list 1710 of pieces of content.

Also, the first device 110 may check whether a drag and drop event occurs from an area that displays predetermined content in the list 1710 of pieces of content of the second device 120 displayed on the first device 110 to an area that displays a predetermined device in the list 1700 of devices.

The first device 110 may select content to be shared and a device with which the content is to be shared, according to the drag and drop event. For example, in FIG. 17, the first device 110 may control the second device 120 to transmit content corresponding to a 'photograph 1' to a device corresponding to a 'device 2' connected to the first device 110 by remotely accessing the second device 120.

The one or more embodiments of the present disclosure may be embodied as a recording medium, e.g., a program module to be executed in computers, which include computer-readable commands. The results produced can be displayed on a display of the computing hardware. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer readable commands, data structures, program modules, or other data. The communication medium includes computer-readable commands, a data structure, a program module, and other transmission mechanisms, and includes other information transmission media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the devices and servers discussed above may include at least one processor to execute at least one of the above-described units and methods.

The present disclosure may, however, be embodied in many different forms and should not be construed as being limited to the embodiments set forth herein; rather these embodiments are provided so that this disclosure will be thorough and complete, and will fully convey the inventive concept to one of ordinary skill in the art. For example, an expression used in the singular may encompass the expression in the plural and an expression used in the plural may encompass the expression in the singular.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims.

What is claimed is:

1. A method of sharing content, the method comprising:
   performing authentication of a remote access service for sharing content of a first device with a second device based on a telephonic connection being established between the first device and the second device;
   remotely accessing the second device via network information about the second device received from the second device, according to a result of the performed authentication; and
   sharing the content based on the remote access.

2. The method of claim 1, wherein the remotely accessing the second device comprises:
   obtaining an internet protocol address of the second device according to the result of the authentication; and
   remotely accessing the second device by using the obtained internet protocol address.

3. The method of claim 1, wherein the performing of the authentication comprises performing the authentication in further consideration of whether a phone number of the second device is stored in the first device.

4. The method of claim 1, wherein the performing of the authentication comprises:
   transmitting to a server authentication information that requests the server to authenticate the remote access service; and
   receiving from the server information about the result of the authentication based on the telephonic connection between the first device and the second device.

5. The method of claim 4, wherein the transmitting of the authentication information to the server comprises:
   storing an encryption key for the authentication; and
   when a phone number of the second device is stored in the first device, transmitting the stored encryption key to the server along with the authentication information that requests the authentication server to authenticate the remote access service.

6. The method of claim 1, wherein the performing of the authentication comprises:
   transmitting authentication information that requests the second device to authenticate the remote access service to the second device; and
   receiving the result of the authentication of the remote access service from the second device.

7. The method of claim 1, further comprising checking information about networks that the second device has access to through a mobile communication network used for call connection,
   wherein the remotely accessing the second device comprises accessing the second device according to the information about the networks that the second device has access to and the result of the authentication.

8. The method of claim 1, wherein the sharing of the content of the first device comprises:
   receiving information about devices connected to the second device from the second device based on the result of the authentication;
   displaying a list of the devices connected to the second device and selecting a third device in the list to which the content is to be transmitted;
   obtaining network information of the third device;
   accessing the third device by using the network information of the third device; and
   sharing the content of the first device with the third device.

9. The method of claim 8, wherein the displaying of the list of the devices connected to the second device and the selecting of the third device with which the content is to be shared comprises:
   selecting a device on which the content is reproducible from among the devices connected to the second device; and
   displaying a list of the selected device.

10. The method of claim 1, further comprising:
    displaying a list of pieces of content that are available for the first device to share; and
    selecting content to be shared from the displayed list, wherein the selecting of the content comprises:
        displaying the second device and a list of devices connected to the second device; and
        selecting the content based on a drag and drop event between the second device and the list of devices connected to the second device from the displayed list of pieces of content.

11. A first device for sharing content, the first device comprising:
    a processor device that performs authentication of a remote access service for sharing the content with a second device based on a telephonic connection state being established between the first device and the second device; and
    a communication unit that remotely accesses the second device, via network information about the second device received from the second device, based on a result of the authentication and shares the content with the second device based on the remote access.

12. The first device of claim 11, further comprising a storage that stores a phone number,
    wherein the processor performs the authentication of the remote access service in further consideration of whether a phone number of the second device is stored in the storage.

13. The first device of claim 11, wherein the communication unit obtains an internet protocol address of the second device according to the result of the authentication, and remotely accesses the second device by using the obtained internet protocol address.

14. The first device of claim 11, wherein the communication unit transmits to a server authentication information that requests the server to authenticate the remote access service, and receives from the server information about the result of the authentication based on the telephonic connection between the first device and the second device.

15. The first device of claim 14, wherein the storage stores an encryption key for the authentication, and
wherein when a phone number of the second device is stored in the first device, the communication unit transmits the stored encryption key to the server along with the authentication information that requests the authentication server to authenticate the remote access service.

16. The first device of claim 11, wherein the communication unit transmits authentication information that requests the second device to authenticate the remote access service to the second device, and receives the result of the authentication of the remote access service from the second device.

17. The first device of claim 11, wherein the processor checks information about networks that the second device has access to through a mobile communication network used for call connection, and
wherein the communication unit accesses the second device according to the information about the networks that the second device has access to and the result of the authentication.

18. The first device of claim 11, further comprising a display,
wherein the communication unit receives information about devices connected to the second device from the second device based on the result of the authentication,
wherein the display displays a list of the devices connected to the second device,
wherein the processor selects a third device in the list to which the content is to be transmitted, and
wherein the communication unit obtains network information of the third device, accesses the third device by using the network information of the third device, and shares the content of the first device with the third device.

19. The first device of claim 18, wherein the processor selects a device on which the content is reproducible from among the devices connected to the second device, and
wherein the display displays a list of the selected device.

20. The first device of claim 11, wherein the display displays a list of pieces of content that are available for the first device to share, and displays the second device and a list of devices connected to the second device, and
wherein the processor selects the content based on a drag and drop event between the second device and the list of devices connected to the second device from the displayed list of pieces of content.

* * * * *